(12) United States Patent
Lien

(10) Patent No.: US 11,334,215 B1
(45) Date of Patent: May 17, 2022

(54) METHOD OF GENERATING USER-INTERACTIVE OBJECT, MULTIMEDIA SYSTEM, AND NON-TRANSITORY COMPUTER-READABLE MEDIUM

(71) Applicant: HTC Corporation, Taoyuan (TW)

(72) Inventor: Kuan-Yi Lien, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/226,104

(22) Filed: Apr. 9, 2021

(51) Int. Cl.
*G06F 3/048* (2013.01)
*G06F 3/04815* (2022.01)
*G06T 19/00* (2011.01)
*G06F 3/04842* (2022.01)
*G02B 27/01* (2006.01)

(52) U.S. Cl.
CPC ...... *G06F 3/04815* (2013.01); *G06F 3/04842* (2013.01); *G06T 19/006* (2013.01); *G02B 27/0172* (2013.01)

(58) Field of Classification Search
CPC ............ G06F 3/04815; G06F 3/04842; G06T 19/006; G02B 27/0172
See application file for complete search history.

(56) References Cited

U.S. PATENT DOCUMENTS 10,606,343 B2 * 3/2020 Veeramani ............ G06F 3/011
2017/0087465 A1 3/2017 Lyons et al.
2019/0133689 A1 * 5/2019 Johnson ................. A61B 34/10
2019/0197765 A1 6/2019 Molyneaux et al.
2021/0243362 A1 * 8/2021 Castillo .................... G06T 7/12
2021/0279957 A1 * 9/2021 Eder .................. G06Q 10/0875

FOREIGN PATENT DOCUMENTS

| CN | 110140100 A | 8/2019 |
|---|---|---|
| CN | 110914788 A | 3/2020 |
| TW | 201237691 A | 9/2012 |
| TW | 201505004 A | 2/2015 |

OTHER PUBLICATIONS

Corresponding Taiwan office action dated Jan. 26, 2022.

* cited by examiner

*Primary Examiner* — Haoshian Shih
(74) *Attorney, Agent, or Firm* — CKC & Partners CO., LLC

(57) ABSTRACT

A method of generating user-interactive object is provided. The method includes the following operations: receiving a picture of a physical environment; identifying a target surface and multiple target objects located on the target surface from the picture to generate an identifying result; generating a virtual surface and multiple virtual three-dimensional (3D) objects located on the virtual surface according to the identifying result, in which the multiple virtual 3D objects are user-interactive objects; and setting multiple operational behaviors of the multiple 3D virtual objects according to a configuration file. The multiple operational behaviors correspond to multiple input operations, respectively. The virtual surface and the multiple virtual objects are for being displayed and manipulated in a virtual environment.

14 Claims, 6 Drawing Sheets

METHOD OF GENERATING USER-INTERACTIVE OBJECT, MULTIMEDIA SYSTEM, AND NON-TRANSITORY COMPUTER-READABLE MEDIUM

BACKGROUND

Technical Field

The present disclosure generally relates to a method of generating objects and multimedia system and non-transitory computer-readable media for realizing the method. More particularly, the present disclosure relates to a method of generating user-interactive objects and multimedia system and non-transitory computer-readable media for realizing the method.

Description of Related Art

Virtual reality (VR) technology uses a computer to simulate a fully immersive three-dimensional virtual world. Augmented reality (AR) technology is not completely immersive, but superimposes virtual objects on real images. As long as the user wears a device that utilizes the above-mentioned technologies, the user can experience various immersive scenes. Therefore, the content limitations to the machine operation training caused by space and cost can be reduces by the VR and AR technologies, which helps to improve the efficiency and flexibility of the training course. However, in present there is no efficient method to rapidly set the content of machine operation training in the AR and VR environments.

SUMMARY

The disclosure provides a method of generating user-interactive objects. The method includes the following operations: receiving an image of a physical environment; identifying a target surface in the image and a plurality of target objects on the target surface to generate an identifying result; generating, according to the identifying result, a virtual surface and a plurality of virtual three-dimensional (3D) objects on the virtual surface, wherein the plurality of virtual 3D objects are user-interactive objects; and configuring, according to a configuration file, a plurality of operational behaviors of the plurality of virtual 3D objects, wherein the plurality of operational behaviors correspond to a plurality of input operations, respectively, and the virtual surface and the plurality of virtual 3D objects are configured to be displayed and operated in a virtual environment.

The disclosure provides a multimedia system including a storage device, a display device, and a computing device. The storage device is configured to store a configuration file. The computing device is coupled with the storage device and the display device, and is configured to: receive an image of a physical environment; identify a target surface in the image and a plurality of target objects on the target surface to generate an identifying result; generate, according to the identifying result, a virtual surface and a plurality of virtual 3D objects on the virtual surface, wherein the plurality of virtual 3D objects are user-interactive objects; and configure, according to a configuration file, a plurality of operational behaviors of the plurality of virtual 3D objects, wherein the plurality of operational behaviors correspond to a plurality of input operations, respectively, and the virtual surface and the plurality of virtual 3D objects are configured to be displayed and operated in a virtual environment.

The disclosure provides a non-transitory computer-readable media including one or more computer-executable instructions for controlling a multimedia system. The multimedia system includes a storage device, a display device, and a computing device. when the computing device executes the one or more computer-executable instructions, the computing device conducts the following operations: receiving an image of a physical environment; identifying a target surface in the image and a plurality of target objects on the target surface to generate an identifying result; generating, according to the identifying result, a virtual surface and a plurality of virtual 3D objects on the virtual surface, wherein the plurality of virtual 3D objects are user-interactive objects; and configuring, according to a configuration file, a plurality of operational behaviors of the plurality of virtual 3D objects, wherein the plurality of operational behaviors correspond to a plurality of input operations, respectively, and the virtual surface and the plurality of virtual 3D objects are configured to be displayed and operated in a virtual environment.

One of the advantages of the above embodiments is to rapidly generate customized virtual training content.

Another advantage of the above embodiments is to provide immersive training content to the user.

DETAILED DESCRIPTION

Figure 1:
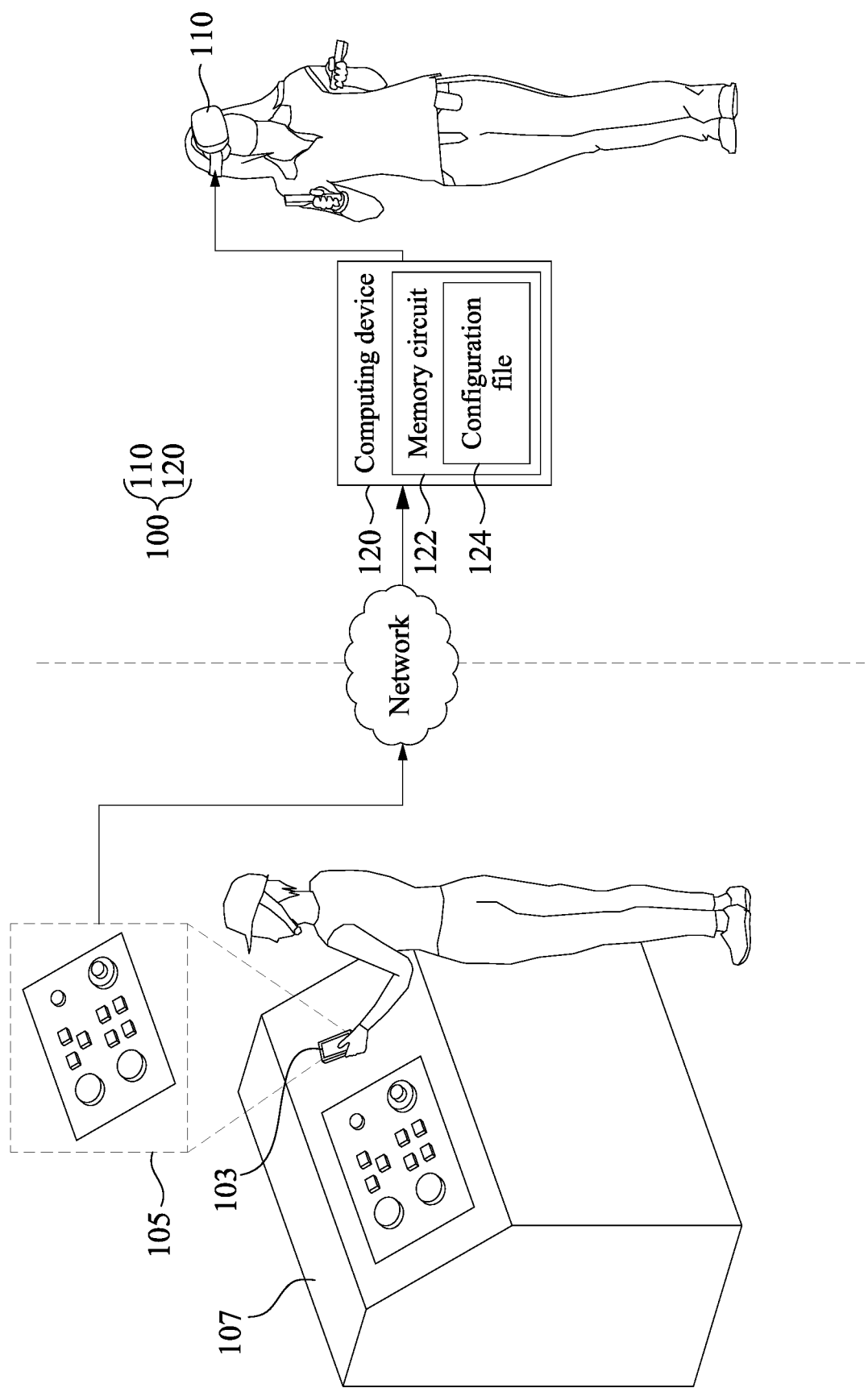
FIG. 1 is a schematic diagram of a multimedia system according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a schematic diagram of a multimedia system 100 according to one embodiment of the present disclosure. The multimedia system 100 comprises a display device 110 and a computing device 120. The display device 110 is configured to display virtual reality (VR) images or augmented reality (AR) images. In some embodiments, the display device 110 can play sounds and/or provide tactile feedback by vibrations. In practice, the display device 110 can be realized by a head-mounted device.

The computing device 120 is coupled with the display device 110, and the computing device 120 is configured to transmit display data (e.g., RGB signals, vertical synchronization signal, and horizontal synchronization signal) to the display device 110 to control contents displayed by the display device 110. The display device 110 can be realized by a personal computer (PC) VR device. In some embodiments, the computing device 120 can be realized by a PC, a server, a laptop, or other programmable electronic devices. In some embodiments, the display device 110 performs functions of the computing device 120, that is, the display device 110 and the computing device 120 may be integrated as one device. In this case, a computing device 120 that is wire or wireless connected from external is not needed, such as a standalone VR device.

The computing device 120 may be communicatively coupled to the electronic device 103 via a network to receive an image 105 obtained by the electronic device 103, in which the image 105 is obtained by photographing a physical environment, but this disclosure is not limited thereto. In some embodiments, the electronic device 103 may transfer the image 105 to the computing device 120 through an external memory (e.g., a memory card or a flash disk). In practice, the electronic device 103 may be realized by a smart phone or a digital camera. In some embodiments, the electronic device 103 may be realized by a camera on the display device 110.

In some embodiments, the electronic device 103 is configured to photograph images of a control panel of a machine 107 in the physical environment, and to transmit the obtained image 105 to the computing device 120 through the network. The computing device 120 is configured to capture, from the image 105, an outward appearance of the control panel. The computing device 120 is further configured to generate, according to the outward appearance of the control panel, a virtual control panel that is user-interactive. In some embodiments, the virtual control panel may be displayed in a virtual environment by the display device 110. That is, the computing device 120 can identify specific objects from the received image, and can automatically generate, according to the identifying result, corresponding virtual objects that are user-interactive.

Figure 2:
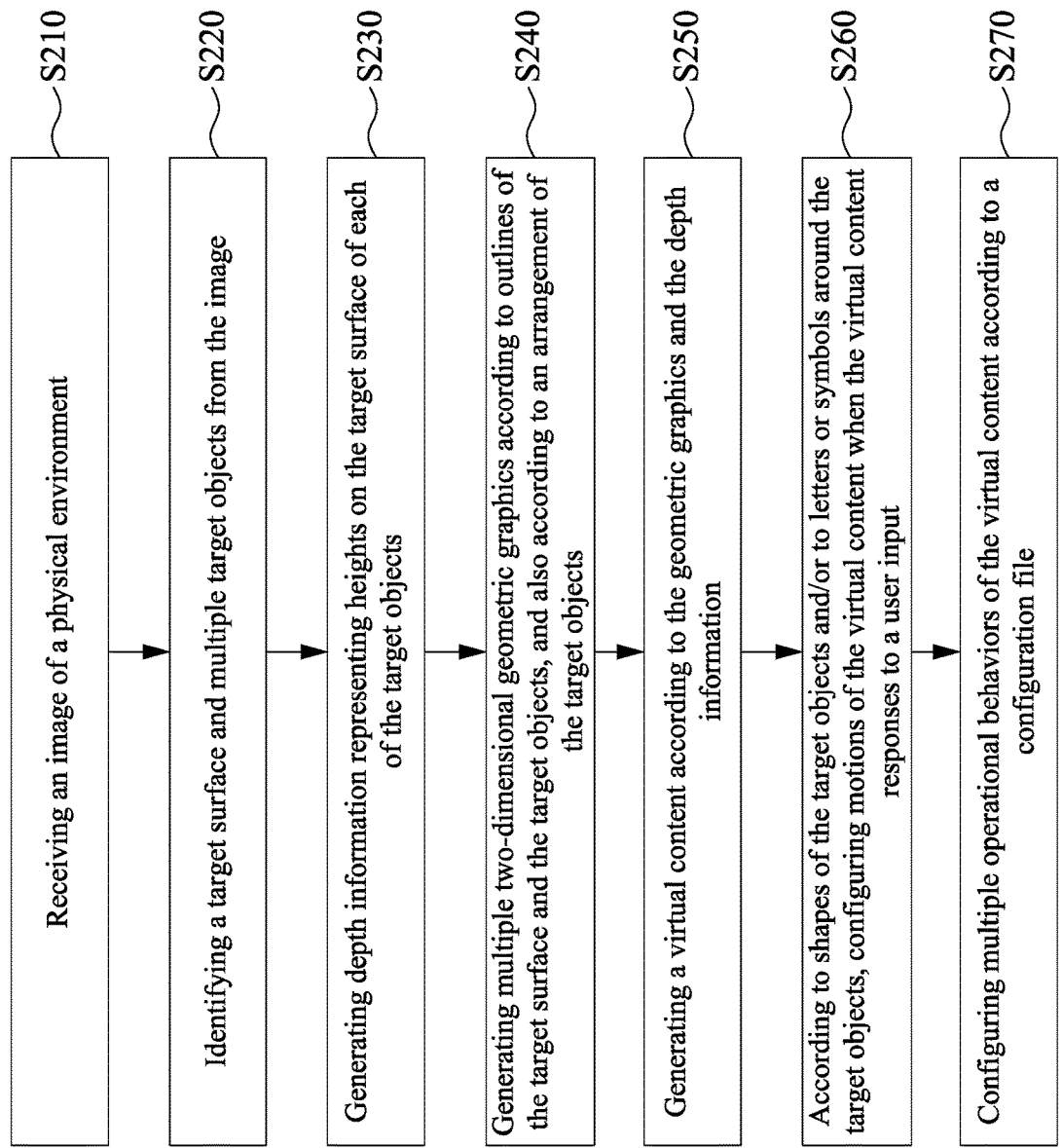
FIG. 2 is a flowchart of a method of generating user-interactive objects.

FIG. 2 is a flowchart of a method 200 of generating user-interactive objects. A memory circuit 122 of the computing device 120 stores one or more computer-executable instructions (not shown). When the computing device 120 executes the computer-executable instructions, the computer-executable instructions cause the computing device 120 to perform the method 200 of generating user-interactive objects. In some embodiments, the memory circuit 122 further stores one or more configuration files 124. The computing device 120 is configured to set, according to the configuration file 124, a plurality of operational behaviors of virtual objects (e.g., generating lights, sounds, images, vibrations, etc.), which will be described in detail in the following paragraphs.

Figure 3:
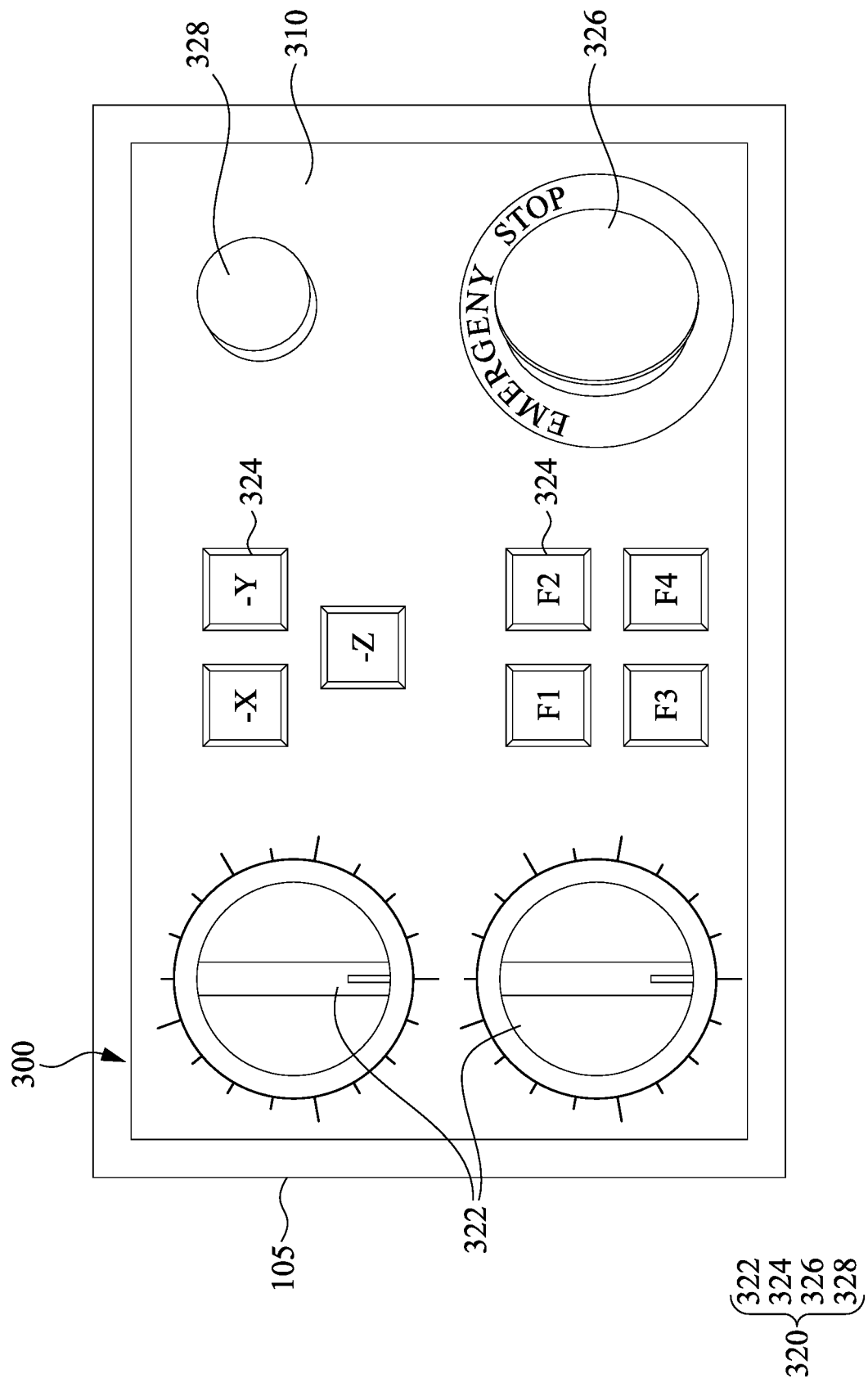
FIG. 3 is an enlarged schematic diagram of the image of FIG. 1.

In operation S210, the computing device 120 receives an image 105 of a physical environment, in which the image 105 is, for example, obtained by photographing the physical environment. FIG. 3 is an enlarged schematic diagram of the image 105. In this embodiment, the image 105 comprises a control panel 300, in which the control panel 300 comprises a surface 310 and a plurality of objects 320 on the surface 310. The objects 320 may be various moveable elements or indicating elements on the control panel 300, such as a plurality of knob switches 322, a plurality of square push buttons 324, a circular push button 326, and an indicating light bulb 328. The objects 320 may also include a toggle switch, a control lever, and a joystick (not shown).

In operation S220, the computing device 120 is configured to identify the control panel 300 from the image 105. In specific, the computing device 120 can identify information of the surface 310 and the objects 320, such as, but not limited to, shapes, outlines, graduations marks, and letters. The computing device 120 can further identify an arrangement and locations, on the surface 310, of the objects 320.

In operation S230, the computing device 120 generates depth information representing heights on the surface 310 of each of the objects 320. For instance, the computing device 120 may analysis the image 105 by suitable algorithms to obtain the depth information. As another example, the computing device 120 can receive (e.g., from the electronic device 103) an additional image of the control panel 300 with a different viewing angle to use the parallax between the two images to calculate the depth information. Methods for generating the depth information will be apparent to those of ordinary skill in the art in view of the teachings herein, and thus are omitted. In some embodiments, the heights on the surface 310 of each object 320 may be values predetermined by the system, or may be values that can be adjusted or set by the user.

Figure 4:
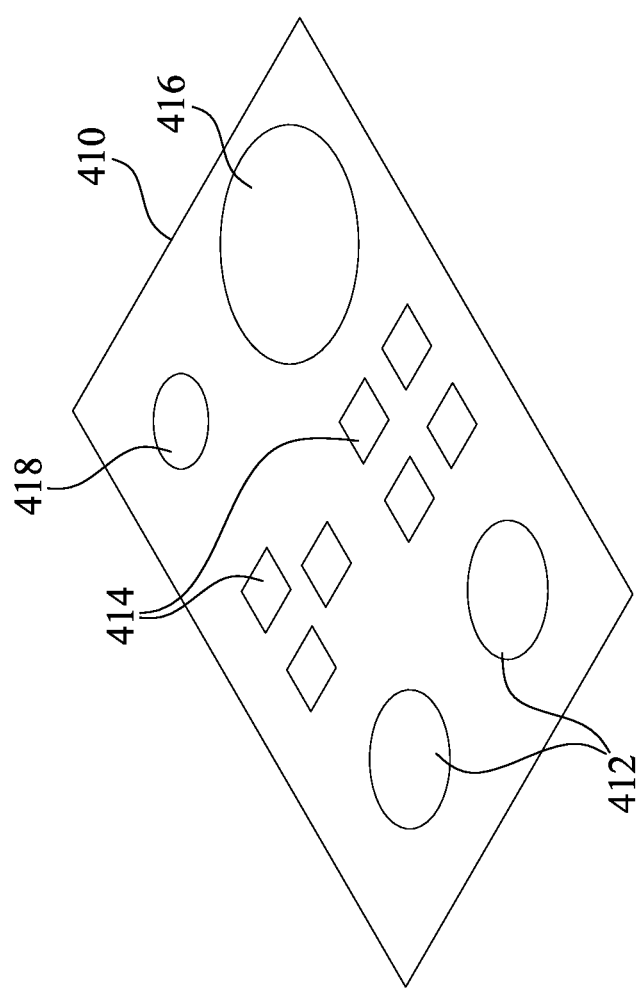
FIG. 4 is a schematic for illustrating generating two-dimensional geometric graphics according to an image of FIG. 1.

Reference is made to FIG. 3 and FIG. 4. In operation S240, the computing device 120 generates a plurality of two-dimensional (2D) geometric graphics 410-418 according to the outlines of the surface 310 and the objects 320, and also according to the arrangement on the surface 310 of the objects 320. In some embodiments, an outline of the geometric graphic 410 is the same or corresponding to the outline of the surface 310; outlines of the geometric graphics 412-418 are the same or corresponding to the outlines of the knob switches 322, the square push buttons 324, the circular push button 326, and the indicating light bulb 328, respectively. In other embodiments, an arrangement, in the geometric graphic 410, of the geometric graphics 412-416 is the same or corresponding to the arrangement, on the surface 310, of the knob switch 322, the square push button 324, the circular push button 326, and the indicating light bulb 328. In some embodiments, the computing device 120 stores the geometric graphics 410-418 as vector graphics.

Figure 5:
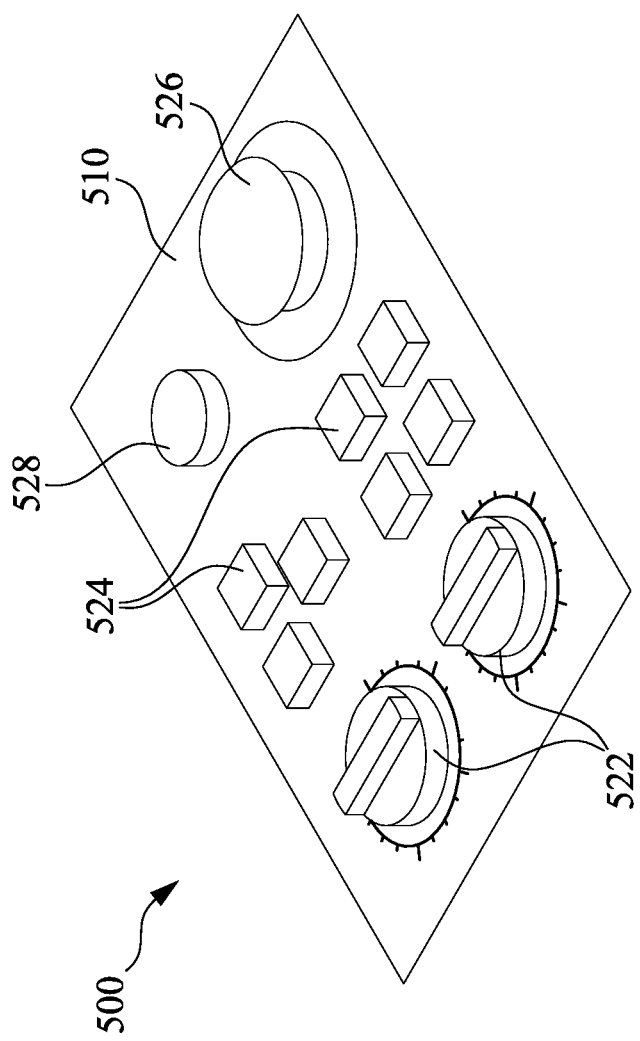
FIG. 5 is a schematic for illustrating generating virtual content according to the image of FIG. 1.

Reference is made to FIG. 4 and FIG. 5. In operation S250, the computing device 120 generates a virtual content 500 according to the geometric graphics 410-418 and the depth information, in which the geometric graphics 410-418 are used to determine outlines or shapes of the virtual content 500, and the depth information is used to determine heights or thicknesses of the virtual content 500. In specific, the virtual content 500 comprises a virtual surface 510 and a plurality of virtual three-dimensional (3D) objects 522-528. The computing device 120 sets an outline of the virtual surface 510 to be the same or corresponding to the outline of the geometric graphic 410, and sets outlines of the virtual 3D objects 522-528 to be the same or corresponding to the outlines of the geometric graphics 412-416, respectively. According to the depth information, the computing device 120 determines heights, on the virtual surface 510, of the virtual 3D objects 522-528. The computing device 120 further sets an arrangement, on the virtual surface 510, of the virtual 3D objects 522-528 to be the same or corresponding to the arrangement, in the geometric graphic 410, of the geometric graphics 412-418. In some embodiments, the heights of the virtual 3D objects 522-528 on the virtual surface 510 may be values predetermined by the system, or may be values that can be adjusted or set by the user.

Accordingly, in operations S210-S250, the multimedia system 100 identifies the surface 310 and the objects 320 in the image 105, and generates a virtual content 500 with an appearance similar or the same as that of the surface 310 and the objects 320.

Then, in operations S260-270, the computing device 120 configures user-interactive functions of the virtual content 500. In operation S260, the computing device 120 configures the virtual 3D objects 522-528 into various categories according to the outlines of the objects 320. When the virtual 3D objects 522-528 response to a user input, the virtual 3D objects of different categories may have different motions. By the different motions, the virtual 3D objects 522-528 may form various virtual moveable elements, such as a virtual knob switch, a virtual push button, a virtual toggle switch, a virtual control lever, a virtual joystick, etc.

Reference is made to FIG. 3 and FIG. 5. For example, the virtual 3D objects 524 are generated according to the objects 324 having square outlines, and thus the computing device 120 configures the virtual 3D objects 524 to be virtual push buttons. As another example, the virtual 3D objects 522 are generated according to the objects 322 having circular outline, and thus the computing device 120 configures the virtual 3D objects 522 to be virtual knob switches. As yet another example, the virtual 3D object 526 is generated according to the object 326 with an arc edge but whose outline is not circular, and thus the computing device 120 configures the virtual 3D object 526 to be a virtual push button. However, this disclosure is not limited thereto.

Figure 6:
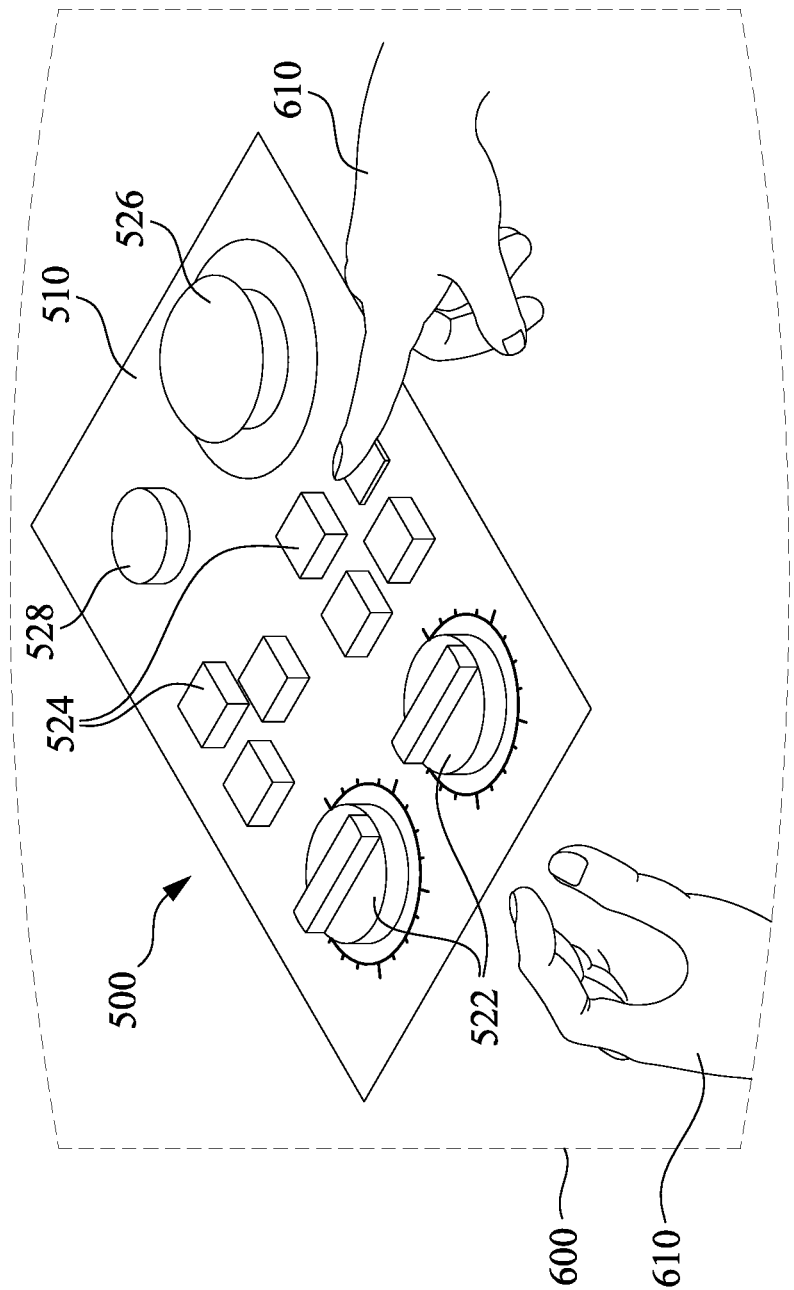
FIG. 6 shows a part of a virtual environment that is in a field of view of a user.

Therefore, in one embodiment as shown in FIG. 6, when the display device 110 displays the virtual content 500 in the virtual environment 600, the virtual 3D objects 524 and 526 response to the user input 610 by moving back and forth in a direction vertical to the virtual surface 510 to simulate push buttons. In addition, the virtual 3D object 522 responses to the user input 610 by generating a rotation movement to simulate a knob switch. Accordingly, the motion of each of the virtual 3D objects 522-528 corresponds to an outline of a corresponding one of the objects 320.

In other embodiments, the computing device 120 configures, according to one or more symbols or letters on or around the objects 320, motions generated by the virtual 3D objects 522-528 when the virtual 3D objects 522-528 response to the user input. Reference is made to FIG. 3 and FIG. 5. For instance, since the virtual 3D objects 522 are generated according to the knob switches 322 and the computing device 120 identifies that there are graduation marks around the knob switches 322, the computing device 120 configures the virtual 3D objects 522 to be virtual knob switches. The computing device 120 may also display the graduation marks at corresponding positions of the virtual 3D objects 522, such as surrounding the virtual 3D objects 522.

As another example, since the virtual 3D objects 524 are generated according to the square push buttons 324 and the computing device 120 identifies that there are readable words "−X," "−Y," "F1," and "F2" on the square push buttons 324, the computing device 120 configures the virtual 3D objects 524 to be square virtual push buttons. The computing device 120 further displays the words at corresponding positions of the virtual 3D objects 524, such as on the virtual 3D objects 524.

As another example, the virtual 3D object 526 is generated according to the circular push button 326 and the computing device 120 identifies that there are readable words "EMERGENCY STOP" surround the circular push button 326, and thus the computing device 120 configures the virtual 3D object 526 to be a circular virtual push button. The computing device 120 further displays the words at corresponding positions of the virtual 3D object 526, such as on the top surface of the virtual 3D object 526. However, this disclosure is not limited thereto.

In some embodiments, the computing device 120 may configure, according to both the outlines of the objects 320 and the letters or symbols around the objects 320, to configure the user-interactive functions of the virtual 3D objects 522-528. As a result, it facilitates the user to configure the user-interactive functions, and also lowers the probability that the computing devices 120 misjudges the categories of the objects 320.

Then, in operation S270, the computing device 120 configures a plurality of operational behaviors of the virtual content 500 according to the configuration file 124, so as to simulate various behaviors of the machine 107 under the real operation situation. In some embodiments, the operational behaviors may be a predetermined light pattern, a predetermined sound, a predetermined image, a predetermined vibration pattern, a predetermined operation of a virtual machine, or a combination of one or more of the above, in which the operational behaviors are generated by the virtual content 500 when the virtual content 500 receives an input operation from the user. The input operation may include one or more of the aforesaid user inputs 610, and different operational behaviors may correspond to different input operations, respectively. For example, as shown in FIG. 6, when the user presses the virtual 3D objects 524 by a specific order to generate the input operation, the virtual 3D object 528 generated according to the indicating light bulb 328 generates indications, for example, the predetermined light pattern to prompt the user whether his/her operation is correct. As another example, when the user rotates the virtual 3D object 522 to generate the input operation and the virtual 3D object 522 is rotated more or less than a predetermined angle, the virtual content 500 may render the display device 110 to play a predetermined sound to prompt the user. However, this disclosure is not limited thereto.

In some embodiments, the computing device 120 identifies the model number of the machine 107 according to the image 105, and then automatically selects, according to the model number of the machine 107, one of candidate configuration files as the configuration file 124, in which the candidate configuration files may be stored in advance. In other embodiments, the user can manually select the configuration file 124 from the candidate configuration files, or the user can edit and store the configuration file 124 on the computing device 120 through an input interface (not shown) of the computing device 120.

In some embodiments, the computing device 120 may provide the configured virtual content 500 to the display device 110 when operation S270 is finished. The display device 110 may display the virtual content 500 in a virtual environment (e.g., the virtual environment 600). As a result, the user of the display device 110 can operate the virtual 3D objects 522-528 in the virtual environment.

As can be appreciate from the above, method 200 of generating user-interactive objects can rapidly generate customized virtual training content, which is help to reduce time and cost for companies to set up virtual training contents and train employees. When the method 200 of generating user-interactive objects is used with the multimedia system 100, the trainees can experience the immersive training content to improve the training results.

The execution order of the operations in FIG. 2 is merely an example, rather than a restriction to practical implementations. For example, operations 230 and 240 in FIG. 2 can be conducted simultaneously or be swapped with each other.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the present disclosure will be apparent to those skilled in the art from consideration of the specification and practice of the present disclosure disclosed herein. It is intended that the specification and examples be considered as exemplary only, with a true scope and spirit of the present disclosure being indicated by the following claims.

What is claimed is:

1. A method of generating user-interactive objects, comprising:
   receiving an image of a physical environment;
   identifying a target surface in the image and a plurality of target objects on the target surface to generate an identifying result;
   generating, according to the identifying result, a virtual surface and a plurality of virtual three-dimensional (3D) objects on the virtual surface, wherein the plurality of virtual 3D objects are user-interactive objects; and
   configuring, according to a configuration file, a plurality of operational behaviors of the plurality of virtual 3D objects, wherein the plurality of operational behaviors correspond to a plurality of input operations, respectively, and the virtual surface and the plurality of virtual 3D objects are configured to be displayed and operated in a virtual environment,
   wherein when a first virtual 3D object of the plurality of virtual 3D objects responses to a user input, the first virtual 3D object has a motion corresponding to an outline of a corresponding one of the plurality of target objects or corresponding to one or more letters or symbols on or around the corresponding one of the plurality of target objects,
   wherein in a situation that the motion corresponding to the outline of the corresponding one of the plurality of target objects:
      if the outline of the corresponding one of the plurality of target objects is a cylinder, the first virtual 3D object forms a virtual knob switch or a virtual push button, and
      if the outline of the corresponding one of the plurality of target objects is a cuboid, the first virtual 3D object forms the virtual push button.

2. The method of claim 1, wherein each of the plurality of operational behaviors comprises one or more of the following: a predetermined light pattern, a predetermined sound, a predetermined image, a predetermined vibration pattern, and a predetermined operation of a virtual machine.

3. The method of claim 1, wherein configuring, according to the configuration file, the plurality of operational behaviors of the plurality of virtual 3D objects comprises:
   selecting, according to the identifying result, a corresponding one of a plurality of candidate configuration files as the configuration file.

4. The method of claim 1, wherein in a situation that the motion corresponding to the one or more letters or symbols on or around the corresponding one of the plurality of target objects:
   if the one or more letters or symbols comprise a plurality of graduation marks, the first virtual 3D object forms the virtual knob switch, and
   if the one or more letters or symbols comprise one or more readable words, the first virtual 3D object forms the virtual push button.

5. The method of claim 1, wherein generating the virtual surface and the plurality of virtual 3D objects on the virtual surface comprises:
   generating a plurality of two-dimensional (2D) geometric graphics according to outlines and an arrangement of the plurality of target objects;
   generating, according to the image, depth information of the plurality of target objects;
   determining, according to the plurality of 2D geometric graphics, shapes of the plurality of virtual 3D objects; and
   determining, according to the depth information, heights on the virtual surface of the plurality of virtual 3D objects.

6. A multimedia system, comprising:
   a storage device, configured to store a configuration file;
   a display device; and
   a computing device, coupled with the storage device and the display device, and configured to:
      receive an image of a physical environment;
      identify a target surface in the image and a plurality of target objects on the target surface to generate an identifying result;
      generate, according to the identifying result, a virtual surface and a plurality of virtual three-dimensional (3D) objects on the virtual surface, wherein the plurality of virtual 3D objects are user-interactive objects; and
      configure, according to the configuration file, a plurality of operational behaviors of the plurality of virtual 3D objects, wherein the plurality of operational behaviors correspond to a plurality of input operations, respectively, and the virtual surface and the plurality of virtual 3D objects are configured to be displayed and operated in a virtual environment,
   wherein when a first virtual 3D object of the plurality of virtual 3D objects responses to a user input, the first virtual 3D object has a motion corresponding to an outline of a corresponding one of the plurality of target objects or corresponding to one or more letters or symbols on or around the corresponding one of the plurality of target objects,
   wherein in a situation that the motion corresponding to the outline of the corresponding one of the plurality of target objects:
      if the outline of the corresponding one of the plurality of target objects is a cylinder, the first virtual 3D object forms a virtual knob switch or a virtual push button, and
      if the outline of the corresponding one of the plurality of target objects is a cuboid, the first virtual 3D object forms the virtual push button.

7. The multimedia system of claim 6, wherein each of the plurality of operational behaviors comprises one or more of the following: a predetermined light pattern, a predetermined sound, a predetermined image, a predetermined vibration pattern, and a predetermined operation of a virtual machine.

8. The multimedia system of claim 6, wherein when the computing device configures, according to the configuration file, the plurality of operational behaviors of the plurality of virtual 3D objects, the computing device is further configured to:
  select, according to the identifying result, a corresponding one of a plurality of candidate configuration files as the configuration file.

9. The multimedia system of claim 6, wherein in a situation that the motion corresponding to the one or more letters or symbols on or around the corresponding one of the plurality of target objects:
  if the one or more letters or symbols comprise a plurality of graduation marks, the first virtual 3D object forms the virtual knob switch, and
  if the one or more letters or symbols comprise one or more readable words, the first virtual 3D object forms the virtual push button.

10. The multimedia system of claim 6, wherein when the computing device generates the virtual surface and the plurality of virtual 3D objects on the virtual surface, the computing device is further configured to:
  generate a plurality of two-dimensional (2D) geometric graphics according to outlines and an arrangement of the plurality of target objects;
  generate, according to the image, depth information of the plurality of target objects;
  determine, according to the plurality of 2D geometric graphics, shapes of the plurality of virtual 3D objects; and
  determine, according to the depth information, heights on the virtual surface of the plurality of virtual 3D objects.

11. A non-transitory computer-readable media, comprising one or more computer-executable instructions for controlling a multimedia system, wherein the multimedia system comprises a storage device, a display device, and a computing device, and when the computing device executes the one or more computer-executable instructions, the computing device conducts following operations:
  receiving an image of a physical environment;
  identifying a target surface in the image and a plurality of target objects on the target surface to generate an identifying result;
  generating, according to the identifying result, a virtual surface and a plurality of virtual three-dimensional (3D) objects on the virtual surface, wherein the plurality of virtual 3D objects are user-interactive objects; and
  configuring, according to a configuration file, a plurality of operational behaviors of the plurality of virtual 3D objects, wherein the plurality of operational behaviors correspond to a plurality of input operations, respectively, and the virtual surface and the plurality of virtual 3D objects are configured to be displayed and operated in a virtual environment,
  wherein when a first virtual 3D object of the plurality of virtual 3D objects responses to a user input, the first virtual 3D object has a motion corresponding to an outline of a corresponding one of the plurality of target objects or corresponding to one or more letters or symbols on or around the corresponding one of the plurality of target objects,
  wherein in a situation that the motion corresponding to the one or more letters or symbols on or around the corresponding one of the plurality of target objects:
    if the one or more letters or symbols comprise a plurality of graduation marks, the first virtual 3D object forms a virtual knob switch, and
    if the one or more letters or symbols comprise one or more readable words, the first virtual 3D object forms a virtual push button.

12. The non-transitory computer-readable media of claim 11, wherein each of the plurality of operational behaviors comprises one or more of the following: a predetermined light pattern, a predetermined sound, a predetermined image, a predetermined vibration pattern, and a predetermined operation of a virtual machine.

13. The non-transitory computer-readable media of claim 11, wherein configuring, according to the configuration file, the plurality of operational behaviors of the plurality of virtual 3D objects comprises:
  selecting, according to the identifying result, a corresponding one of a plurality of candidate configuration files stored in the storage device as the configuration file.

14. The non-transitory computer-readable media of claim 11, wherein generating the virtual surface and the plurality of virtual 3D objects on the virtual surface comprises:
  generating a plurality of two-dimensional (2D) geometric graphics according to outlines and an arrangement of the plurality of target objects;
  generating, according to the image, depth information of the plurality of target objects;
  determining, according to the plurality of 2D geometric graphics, shapes of the plurality of virtual 3D objects; and
  determining, according to the depth information, heights on the virtual surface of the plurality of virtual 3D objects.

* * * * *